United States Patent
Kern et al.

(10) Patent No.: US 8,628,424 B1
(45) Date of Patent: Jan. 14, 2014

(54) INTERACTIVE SPECTATOR FEATURES FOR GAMING ENVIRONMENTS

(75) Inventors: Mark Kern, Aliso Viejo, CA (US); Scott Youngblood, Aliso Viejo, CA (US)

(73) Assignee: Red 5 Studios, Inc., Laguna Hills, CA (US)

( * ) Notice: Subject to any disclaimer, the term of this patent is extended or adjusted under 35 U.S.C. 154(b) by 0 days.

(21) Appl. No.: 13/536,941

(22) Filed: Jun. 28, 2012

(51) Int. Cl.
*A63F 9/24* (2006.01)

(52) U.S. Cl.
USPC .................................. 463/42; 463/31; 463/33

(58) Field of Classification Search
USPC ......... 463/31, 33, 42; 345/419, 473, 474, 475
See application file for complete search history.

(56) References Cited

U.S. PATENT DOCUMENTS

| | | | |
|---|---|---|---|
| 5,371,852 A | 12/1994 | Attanasio et al. | |
| 5,384,910 A | 1/1995 | Torres | |
| 5,943,052 A | 8/1999 | Allen et al. | |
| 6,067,545 A | 5/2000 | Wolff | |
| 6,330,605 B1 | 12/2001 | Christensen et al. | |
| 6,374,336 B1 | 4/2002 | Peters et al. | |
| 6,380,933 B1 | 4/2002 | Sharir et al. | |
| 6,434,398 B1 * | 8/2002 | Inselberg | 455/517 |
| 6,456,304 B1 | 9/2002 | Angiulo et al. | |
| 6,466,275 B1 | 10/2002 | Honey et al. | |
| 6,561,811 B2 | 5/2003 | Rapoza et al. | |
| 6,571,216 B1 | 5/2003 | Garg et al. | |
| 6,597,375 B1 | 7/2003 | Yawitz | |
| 6,629,129 B1 | 9/2003 | Bookspan et al. | |
| 6,699,127 B1 | 3/2004 | Lobb et al. | |
| 6,760,042 B2 | 7/2004 | Zetts | |
| 6,760,595 B2 * | 7/2004 | Inselberg | 455/517 |
| 6,772,195 B1 | 8/2004 | Hatlelid et al. | |
| 6,864,886 B1 | 3/2005 | Cavallaro et al. | |
| 6,928,485 B1 | 8/2005 | Krishnamurthy et al. | |
| 6,996,413 B2 * | 2/2006 | Inselberg | 455/517 |
| 6,999,083 B2 * | 2/2006 | Wong et al. | 345/473 |
| 7,075,556 B1 | 7/2006 | Meier et al. | |
| 7,133,051 B2 | 11/2006 | Sloo et al. | |
| 7,219,160 B1 | 5/2007 | Buchsbaum et al. | |
| 7,350,158 B2 | 3/2008 | Yamaguchi et al. | |

(Continued)

FOREIGN PATENT DOCUMENTS

| | | |
|---|---|---|
| DE | 102005034692 | 2/2007 |
| EP | 1879381 | 1/2008 |

(Continued)

OTHER PUBLICATIONS

"Counter Strike Manual" published on or before May 15, 2006, and retrieved from URL <http://web.archive.org/web/20060515161034/http://voidclan.tripod.com/csmanual.htm>, 17 pages.*

(Continued)

*Primary Examiner* — William Brewster
*Assistant Examiner* — Jason Skaarup
(74) *Attorney, Agent, or Firm* — Carr & Ferrell LLP

(57) ABSTRACT

Systems and methods for exchanging virtual rewards for computing resources are provided herein. Exemplary methods may include receiving access to a portion of computing resources of an end user computing system and providing a virtual reward within a gaming environment to an end user in exchange for utilizing an amount of the portion of the computing resources of the end user computing system.

14 Claims, 5 Drawing Sheets

(56) References Cited

U.S. PATENT DOCUMENTS

| | | |
|---|---|---|
| 7,390,254 B2 | 6/2008 | Hirai |
| 7,458,894 B2 * | 12/2008 | Danieli et al. .................. 463/42 |
| 7,490,314 B2 | 2/2009 | Yuknewicz et al. |
| 7,492,363 B2 | 2/2009 | Meier et al. |
| 7,506,318 B1 | 3/2009 | Lindo et al. |
| 7,632,186 B2 * | 12/2009 | Spanton et al. ................. 463/40 |
| 7,719,971 B1 | 5/2010 | Issa |
| 7,729,992 B2 | 6/2010 | Rose |
| 7,844,301 B2 | 11/2010 | Lee et al. |
| 7,890,701 B2 | 2/2011 | Lowery et al. |
| 7,917,632 B2 | 3/2011 | Lee et al. |
| 7,970,820 B1 | 6/2011 | Sivasubramanian et al. |
| 8,001,063 B2 | 8/2011 | Tesauro et al. |
| 8,025,569 B2 | 9/2011 | Nguyen et al. |
| 8,025,572 B2 * | 9/2011 | Spanton et al. .................. 463/42 |
| 8,128,469 B2 | 3/2012 | Hormigo Cebolla et al. |
| 8,128,503 B1 | 3/2012 | Haot et al. |
| 8,130,747 B2 | 3/2012 | Li et al. |
| 8,235,817 B2 | 8/2012 | Zalewski |
| 2001/0036356 A1 | 11/2001 | Weaver et al. |
| 2001/0055991 A1 | 12/2001 | Hightower |
| 2002/0002074 A1 * | 1/2002 | White et al. ..................... 463/25 |
| 2002/0032056 A1 | 3/2002 | Oh |
| 2002/0097984 A1 | 7/2002 | Abecassis |
| 2002/0183115 A1 | 12/2002 | Takahashi et al. |
| 2002/0198769 A1 | 12/2002 | Ratcliff, III |
| 2003/0038805 A1 | 2/2003 | Wong et al. |
| 2003/0084462 A1 | 5/2003 | Kubota et al. |
| 2003/0220143 A1 * | 11/2003 | Shteyn et al. ................... 463/42 |
| 2004/0087363 A1 | 5/2004 | Bogenn |
| 2004/0116183 A1 | 6/2004 | Prindle |
| 2004/0153569 A1 | 8/2004 | Savathphoune |
| 2004/0192354 A1 | 9/2004 | Sawano |
| 2004/0248631 A1 | 12/2004 | Hirai |
| 2004/0259627 A1 | 12/2004 | Walker et al. |
| 2005/0020359 A1 | 1/2005 | Ackley et al. |
| 2005/0071736 A1 | 3/2005 | Schneider et al. |
| 2005/0091597 A1 | 4/2005 | Ackley |
| 2005/0227771 A1 | 10/2005 | Nelson et al. |
| 2006/0058103 A1 * | 3/2006 | Danieli et al. .................. 463/42 |
| 2006/0098013 A1 | 5/2006 | Wong et al. |
| 2006/0170778 A1 | 8/2006 | Ely et al. |
| 2006/0206565 A1 | 9/2006 | Ganesan et al. |
| 2006/0258446 A1 | 11/2006 | Nguyen et al. |
| 2007/0055694 A1 | 3/2007 | Ruge et al. |
| 2007/0063995 A1 | 3/2007 | Bailey et al. |
| 2007/0117617 A1 | 5/2007 | Spanton et al. |
| 2007/0117635 A1 | 5/2007 | Spanton et al. |
| 2007/0250901 A1 | 10/2007 | McIntire et al. |
| 2007/0256030 A1 | 11/2007 | Bedingfield, Sr. |
| 2007/0298878 A1 | 12/2007 | Short |
| 2008/0026839 A1 | 1/2008 | Alringer |
| 2008/0052384 A1 | 2/2008 | Marl et al. |
| 2008/0119286 A1 * | 5/2008 | Brunstetter et al. ............. 463/43 |
| 2008/0125226 A1 | 5/2008 | Emmerson |
| 2008/0126357 A1 | 5/2008 | Casanova et al. |
| 2008/0146339 A1 | 6/2008 | Olsen et al. |
| 2008/0146342 A1 | 6/2008 | Harvey et al. |
| 2009/0005196 A1 | 1/2009 | Kessler et al. |
| 2009/0017750 A1 | 1/2009 | Marcinkiewicz |
| 2009/0031227 A1 | 1/2009 | Chakrabarti et al. |
| 2009/0044113 A1 * | 2/2009 | Jones et al. ................... 715/707 |
| 2009/0083662 A1 | 3/2009 | Fitzmaurice et al. |
| 2009/0083665 A1 | 3/2009 | Anttila et al. |
| 2009/0100366 A1 | 4/2009 | Fitzmaurice et al. |
| 2009/0118017 A1 | 5/2009 | Perlman et al. |
| 2009/0118018 A1 | 5/2009 | Perlman et al. |
| 2009/0118019 A1 | 5/2009 | Perlman et al. |
| 2009/0118020 A1 | 5/2009 | Koivisto et al. |
| 2009/0124387 A1 | 5/2009 | Perlman et al. |
| 2009/0144380 A1 | 6/2009 | Kallman et al. |
| 2009/0172171 A1 | 7/2009 | Amir |
| 2009/0208181 A1 | 8/2009 | Cottrell |
| 2009/0215531 A1 | 8/2009 | Perlman et al. |
| 2009/0215540 A1 | 8/2009 | Perlman et al. |
| 2009/0249189 A1 | 10/2009 | Jania et al. |
| 2009/0254998 A1 | 10/2009 | Wilson |
| 2009/0265473 A1 | 10/2009 | Hydrie et al. |
| 2009/0290753 A1 | 11/2009 | Liu et al. |
| 2009/0297118 A1 | 12/2009 | Fink et al. |
| 2009/0326970 A1 | 12/2009 | Estrada et al. |
| 2010/0014825 A1 | 1/2010 | Curtis et al. |
| 2010/0031333 A1 | 2/2010 | Mitchell et al. |
| 2010/0041475 A1 | 2/2010 | Zalewski et al. |
| 2010/0064008 A1 | 3/2010 | Yan et al. |
| 2010/0100849 A1 | 4/2010 | Fram |
| 2010/0150120 A1 | 6/2010 | Schlicht et al. |
| 2010/0154050 A1 | 6/2010 | Mukkara et al. |
| 2010/0167809 A1 | 7/2010 | Perlman et al. |
| 2010/0167816 A1 | 7/2010 | Perlman et al. |
| 2010/0169964 A1 | 7/2010 | Liu et al. |
| 2010/0174782 A1 | 7/2010 | Rose |
| 2010/0281095 A1 | 11/2010 | Wehner et al. |
| 2010/0281432 A1 | 11/2010 | Geisner et al. |
| 2011/0013087 A1 | 1/2011 | House et al. |
| 2011/0028194 A1 | 2/2011 | Tang et al. |
| 2011/0029932 A1 | 2/2011 | McKaskle et al. |
| 2011/0055222 A1 | 3/2011 | Choudur et al. |
| 2011/0059818 A1 | 3/2011 | Blais et al. |
| 2011/0093600 A1 | 4/2011 | Lee et al. |
| 2011/0105226 A1 | 5/2011 | Perlman |
| 2011/0111854 A1 | 5/2011 | Roberts et al. |
| 2011/0145880 A1 | 6/2011 | Wang |
| 2011/0151971 A1 | 6/2011 | Altshuler et al. |
| 2011/0161666 A1 | 6/2011 | Gladwin et al. |
| 2011/0202562 A1 | 8/2011 | Bloch et al. |
| 2011/0238618 A1 | 9/2011 | Valdiserri et al. |
| 2011/0263333 A1 * | 10/2011 | Dokei et al. .................... 463/42 |
| 2011/0275431 A1 | 11/2011 | Hirzel et al. |
| 2011/0295666 A1 | 12/2011 | Musial et al. |
| 2012/0054002 A1 | 3/2012 | Rotbard et al. |
| 2012/0054685 A1 | 3/2012 | Su et al. |
| 2012/0130863 A1 | 5/2012 | Tedjamulia et al. |
| 2012/0142433 A1 | 6/2012 | Perlman et al. |
| 2012/0149476 A1 | 6/2012 | Perlman et al. |
| 2012/0151346 A1 | 6/2012 | McClements, IV |
| 2012/0151347 A1 | 6/2012 | McClements, IV |
| 2012/0204107 A1 | 8/2012 | Salinas |
| 2012/0311624 A1 | 12/2012 | Oskolkov et al. |
| 2013/0084970 A1 | 4/2013 | Geisner et al. |

FOREIGN PATENT DOCUMENTS

| | | |
|---|---|---|
| JP | 2004362149 | 12/2004 |
| WO | WO9712342 | 4/1997 |
| WO | WO2006076075 | 7/2006 |

OTHER PUBLICATIONS

"Spectator FAQ" published on or before Nov. 11, 2011 and retrieved from URL <http://web.archive.org/web/20111110125011/http://na.leagueoflegends.com/spectator-faq>, 4 pages.*

"Killcam Description for Call of Duty" published on or before Nov. 11, 2011 and retrieved from URL <http://web.archive.org/web/20111126172904/http://callofduty.wikia.com/wiki/Killcam>, 7 pages.*

"Counter-Strike" game description published on or before Nov. 21, 2010 and retrieved from URL <http://web.archive.org/web/20101121144545/http://en.wikipedia.org/wiki/Counter-Strike>, 6 pages.*

Abd El-Sattar. A Novel Interactive Computer-Based Game Framework: From Design to Implementation. 2008 International Conference Visualisation [Online] 2008, pp. 123-128.

Blevins. Neverwinter Nights—PC Review at IGN—p. 2. http://pc.ign.com/articles/363/363038p2.html (accessed Aug. 12, 2011).

Haynes. Dead Space Review—Xbox 360 Review at IGN—pp. 2 & 3. http://xbox360.ign.com/articles/918/918892p2.html & http://xbox360.ign.com/articles/918/918892p3.html (accessed Aug. 12, 2011).

Hernandez et al. WeSketch: A 3D Real Time Collaborative Virtual Environment that Improves the GUI Sketching Task. 2011 Eighth International Conference on Information Technology: New Generations [Online] 2011.

(56) References Cited

OTHER PUBLICATIONS

Raskin. Graph Plus. PC Magazine [Online] Oct. 17, 1989. V8, N17, p. 102(3).
Rowe et al. A Framework for Narrative Adaptation in Interactive Story-Based Learning Environments. Proceedings of the Intelligent Narrative Technologies III Workshop [Online] 2010.
Ludwig et al., "XEP-0166: Jingle," XMPP Standards Foundation. pp. 1-53. Dec. 23, 2009.
Rosenberg, "Interactive Connectivity Establishment (ICE): A Protocol for Network Address Translator (NAT) Traversal for Offer/Answer Protocols," Internet Engineering Task Force (IETF). pp. 1-117, Apr. 2010.
Zhou et al., "A Method of View-Frustum Culling with OBB Based on Octree," IET Conference on Wireless, Mobile and Sensor Networks 2007, pp. 680-682, Jan. 1, 2007. XP55023509.
World of Warcraft Gold, Anything About WOW, Apr. 23, 2007. retrieved from the internet: http://wowgolds.wordpress.com/2007/04/23/how-to-take-and-make-screenshots/ (accessed on Mar. 30, 2012) XP002672710.
Extended European Search Report with mail date of Mar. 30, 2012, re European Application No. 12151200.8 filed Jan. 16, 2012.
"Algemagorgic Non-Modal Context Menu," CodeGuru, May 22, 2004. retrieved from the internet: http://forums.codeguru.com/showthread.php?t=295801 (accessed on Apr. 27, 2012) XP002675225.
"Context Menu," Wikipedi, the free encyclopedia, Jun. 16, 2010. retrieved from the internet: http://en.wikipedia.org/w/index.php?title=Context_menu&oldid=368337587 (accessed on May 3, 2012) XP002675226.
"Maptool Concepts: The Next UI, Look, and Feel," RPTools.net, Feb. 2010. retrieved from the internet: http://forums.rptools.net/viewtopic.php?f=7&t=13178&sid=107ad2f90d833d6b5669fbeO3587b091&start=45 (accessed May 3, 2012) XP002675227.
"Pie Menu," Wikipedia, the free encyclopedia, Jul. 5, 2010. retrieved from the internet: http://en.wikipedia.org/w/index.php?title=Pie_menu&oldid=371797903 (accessed May 3, 2012) XP002675228.
"Modal Window," Wikipedia, the free encyclopedia, Aug. 18, 2010. retrieved from the internet: http://en.wikipedia.org/w/index.php?title=Modal_window&oldid=379626221 (accessed on May 3, 2012) XP002675229.
Extended European Search Report with mail date of May 4, 2012, re European Application No. 11006996.0 filed Aug. 26, 2011.
"CPUsage wants to harness idle computer power for others to use" written by O.K. Row, available on or before Jul. 2012 and retrieved from URL <http://www.oregonlive.com/small-business/index.ssf/2012/07/cpusage_wants_to_harness_idle.html>, 3 pages.
"CPUsage: Let Your PC Earn Money for You" written by Lambert Varias, available on or before Aug. 26, 2011 and retrieved from URL <http://technabob.com/blog/2011/08/26/cpusage-make-money-with-your-pc/>, 3 pages.

"Need cash? Forget plasma, and donate CPU time instead" written by Stacey Higginbotham, available on or before Jul. 11, 2011 and retrieved from URL <http://gigaom.com/cloud/need-cash-forget-plasma-and-donate-cpu-time-instead/>.
"Info on Points and Redemption" written by Jeff Martens, available on or before Jul. 20, 2011 and retrieved from URL<http://www.cpusage.com/blog/computer-owners/info-on-points-and-redemption/>, 1 page.
"Apr./May 2011 Admin Requirement Application—Europe." 13d.net. Online. Apr. 24, 2011. Accessed via the Internet. Accessed Nov. 8, 2012. <URL: http://forum.i3d.net/battlefield-heroes-ranked-community-servers/170034-apr-may-2011-admin-requirement-application-europe.html#post1270013>.
BlamDarot, "Achievement Screenshotter", World of Warcraft Mod, Created Jul. 3, 2009, Last Updated Nov. 4, 2010, description accessed at http://wow.curseforge.com/addons/achievement-screenshotter on Feb. 15, 2013.
Rytych, "Game-like environments for nuclear engineering education using GECK", 1st International Nuclear & Renewable Energy Conference (INREC), pp. 1-5, IEEE, Mar. 2010.
Extended European Search Report with mail date of Dec. 3, 2012, re European Application No. 12170191.6 filed May 31, 2012.
Zhang, J. et al "WindTalker: A P2P-Based Low-Latency Anonymouns Communication Network," IEICE Transactions on Communications, Communications Society, Tokyo, JP, vol. E92B, No. 10, Oct. 1, 2009, pp. 3183-3194.
Extended European Search Report with mail date of Jan. 8, 2013, re European Application No. 12170200.5 filed May 31, 2012.
International Search Report mailed Feb. 21, 2013 in application No. PCT/US2012/20007, filed Jan. 12, 2012.
"Neverwinter Nights Platinum". Game Manual. Copyright 2004, Atari Interactive, Inc. 114 pages.
"Horse menu". Neverwinter Nights Wiki page. Http://nwnwikia.com/wiki/Horse_menu. 2 pages.
"Official Rules of Baseball—2011 Edition". Major League Baseball. Feb. 16, 2011. Retrieved from the internet. Retrieved Jun. 1, 2013. <URL:http://web.archive.org/web/20120112040330/http://mlb.mlb.com/mlb/official_info/official_rules/foreword.jsp>.
Murph, Darren. "Editorial: ESPN bypasses corporate red tape with iPad and Xbox 360, wannabe innovators should take note" Jun. 12, 2010. <http://www.engadget.com/2010/06/12/editorial-espn-bypasses-corporate-red-tape-with-ipad-and-xbox-3/>.
Point-HD Telestrator with Ipad. <http://www.hdtelestrators.com/Ipad%20Telestrator.html>.
Bloviator, "America's Army Training Guide", www.gamefaqs.com, Online, Mar. 24, 2008, Accessed via the Internet Sep. 13, 2013, <URL: http://www.gamefaqs.com/pc/561551-americas-army/faqs/45333>.

\* cited by examiner

INTERACTIVE SPECTATOR FEATURES FOR GAMING ENVIRONMENTS

FIELD OF THE INVENTION

The present technology relates generally to videogames and gaming environments, and more specifically, but not by way of limitation, to videogames and gaming environments that allow for spectator interaction within the gaming environment. In some instances, spectators may control or affect at least a portion of the gaming experience of an active participant.

BACKGROUND

Spectator modes within video games often allow for non-participating parties (e.g., spectators) to view game play or activities of active gaming participants (e.g., individuals playing the videogame). While these spectator modes allow spectators to view game play, they do not allow for spectators to actually control or influence the gaming experience of a game participant.

SUMMARY OF THE INVENTION

According to some embodiments, the present technology may be directed to methods for providing spectator feedback within a gaming environment that comprise: (a) receiving, via a networked gaming system, spectator feedback relative to at least one active participant within the gaming environment; and (b) providing, within the gaming environment, indication of the spectator feedback to the at least one active participant.

According to other embodiments, the present technology may be directed to methods for facilitating spectator interaction with a gaming environment that comprise: (a) providing a spectator access to view the gaming environment; (b) providing the spectator with one or more options for interacting with the gaming environment; (c) receiving a selection of the one or more options from the spectator; and (d) effecting a change within the gaming environment based upon the selection.

According to additional embodiments, the present technology may be directed to a system that facilitates a gaming environment that comprises: (a) at least one server that is selectively coupleable to an end user computing system, the at least one server comprising a processor configured to execute instructions that comprise: (i) a videogame program that provides the gaming environment, the videogame program comprising: (1) a spectator module that provides a spectator access to view the gaming environment; (2) a interactivity module that provides the spectator with one or more options for interacting with the gaming environment and receives a selection of the one or more options from the spectator; and (3) a implementation module that effects a change within the gaming environment based upon the selection.

DETAILED DESCRIPTION OF EXEMPLARY EMBODIMENTS

Figure 1:
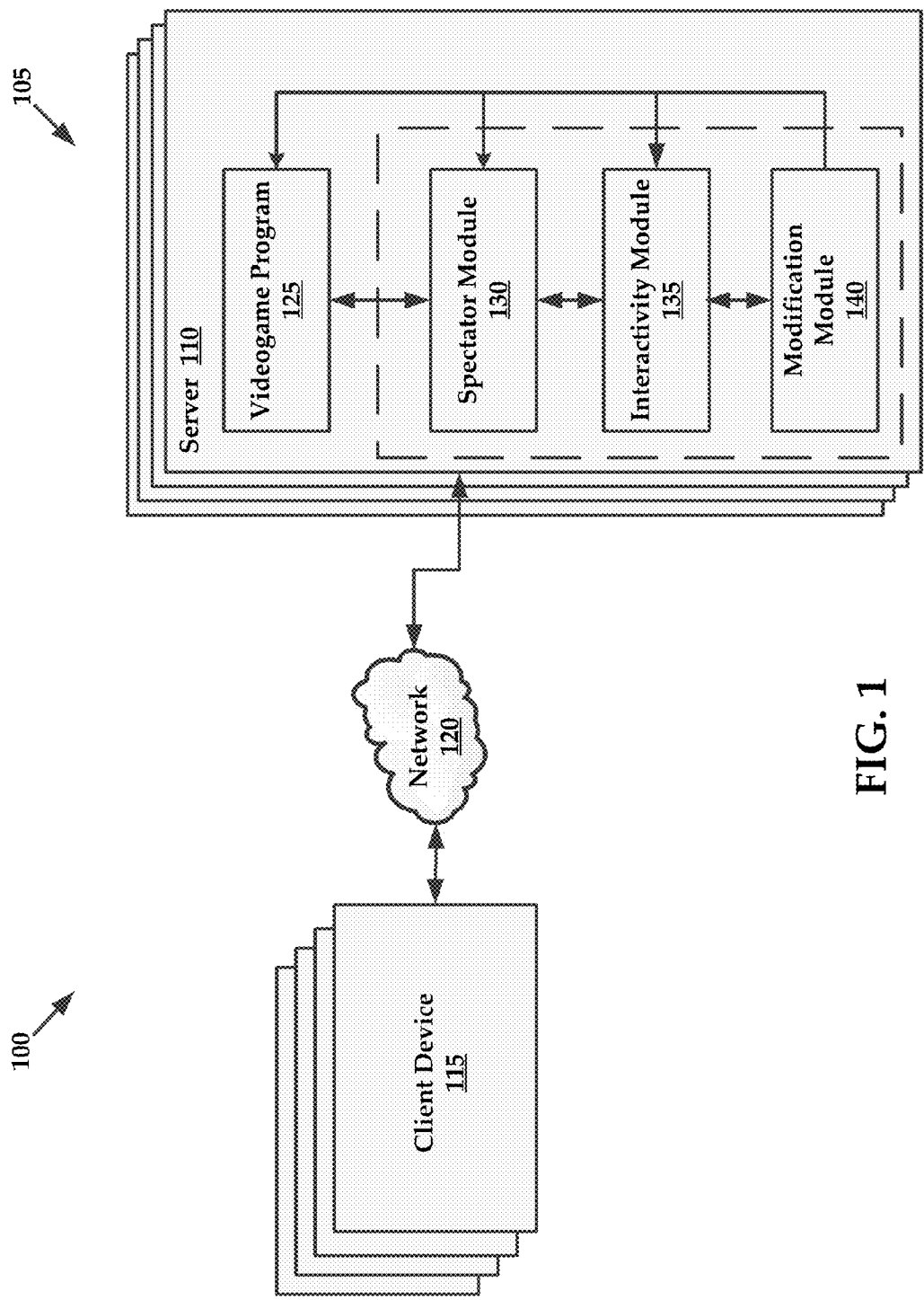
FIG. 1 illustrates an exemplary architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

According to some embodiments, the present technology may provide interactive spectator features within videogames, and specifically the gaming environment of the videogame. Broadly speaking, these interactive spectator features allow spectators to not only to passively view the gaming environment, but also control or affect a gaming experience of an active participant. The spectator may affect the gaming experience of the active participant in various ways. For example, the spectator may cheer, applaud, complain, or otherwise provide feedback to the gaming system that facilitates the gaming environment. Feedback may be received by way of an end user computing system operated by a spectator. Exemplary end user computing systems include, but are not limited to, personal computers, mobile devices, videogame consoles, and so forth. Furthermore, feedback may be received from input devices associated with the end user computing systems, such as a keyboard, a microphone, a Bluetooth headset, a mouse, a motion-based input device, a webcam, and so forth.

This feedback may be provided to active participants within the gaming environment to augment or enhance the gaming experience of the active participants. In other embodiments, spectators may modify the gaming experience of an active participant by altering the gaming environment. For example, spectators may arrange competitions between active participants; allow the active participant to be killed/saved during a combat scenario; generate impediments (e.g., enemies, bosses, obstacles, etc.) for the active participant; present the active participant with a challenge; or any combinations thereof.

Generally speaking, the term "spectator" may be understood to include a non-participating actor that is allowed to view and/or modify the gaming environment. While the spectator may interact with the gaming environment, these interactions only allow for indirect interaction with the gaming environment. Spectators may enter the gaming environment via a spectator mode. In some instances, an active participant may be placed into "spectator mode" and become a spectator when they are killed or otherwise prevented from being an active participant. Thus, an active participant is an actor that directly interacts with the gaming environment (e.g., a player).

In some instances, active participants may also provide responsive feedback reactively to feedback that is directed to the active participants from one or more spectators. These and other advantages of the present technology will be discussed in greater detail herein.

FIG. 1 illustrates an exemplary architecture 100 for practicing aspects of the present technology. The architecture 100 is shown as including a networked gaming system 105 implemented within the context of a server 110 (shown within a plurality of web servers). The networked gaming system 105 may facilitate the operation of a videogame program 125 that generates a gaming environment.

An end user computing system 115 (shown within a plurality of end user computing systems) may be communicatively coupled to the server 110 via a network connection 120. It will be understood that the network connection 120 may include any private or public network such as the Internet.

When the end user computing system 115 is communicatively coupled to the server 110, spectators may interact with the gaming environment generated by a videogame program 125 using the end user computing system 115. Likewise, active participants may interact with the gaming environment using the end user computing system 115.

In some embodiments, the networked gaming system 105 may be implemented as a cloud-based computing environment. In general, a cloud-based computing environment is a resource that combines the computational power of a large grouping of processors and/or that combines the storage capacity of a large grouping of computer memories or storage devices. For example, systems that provide a cloud resource may be utilized exclusively by their owners. These systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

According to some embodiments, the networked gaming system 105 may be generally described as a particular purpose computing environment that includes executable instructions stored in memory. These instructions, when executed by the processor provide interactive spectator features within the gaming environment. More specifically, the networked gaming system 105 may execute the videogame program 125 to generate a gaming environment (see FIG. 4 for an exemplary view of a gaming environment). The videogame program 125 may comprise one or more mechanisms for facilitating spectator interaction with the gaming environment. According to some embodiments, the networked gaming system 105 may receive spectator feedback relative to at least one active participant within the gaming environment. Additionally, the networked gaming system 105 may provide indication of the spectator feedback to the at least one active participant within the gaming environment. Thus, spectator feedback may be utilized to enhance and/or alter the gaming experience of the at least one active participant.

In accordance with the present technology, the networked gaming system 105 may facilitate spectator interaction with a gaming environment by first providing a spectator access to a view the gaming environment. Next, the networked gaming system 105 may provide the spectator with one or more options for interacting with the gaming environment. The networked gaming system 105 may then receive a selection of the one or more options from the spectator and finally effect a change within the gaming environment based upon the selection. The changed that is affected within the gaming environment may directly impact or alter the gaming experience of one or more active participants.

In some embodiments, the executable instructions such as a videogame program 125 that facilitates a gaming environment may reside on the server 110. In some instances, the videogame program 125 may comprise a spectator module 130, an interactivity module 135, and an implementation module 140. In other embodiments, the spectator module 130, the interactivity module 135, and the implementation module 140 may cooperate together as a standalone plug-in or module that is separate from the videogame program 125.

It is noteworthy that the server 110 may include additional modules, engines, or components, and still fall within the scope of the present technology. As used herein, the term "module" may also refer to any of an application-specific integrated circuit (ASIC), an electronic circuit, a processor (shared, dedicated, or group) that executes one or more software or firmware programs, a combinational logic circuit, and/or other suitable components that provide the described functionalities.

According to some embodiments, the spectator module 130 may provide a spectator access to view the gaming environment, while the interactivity module 135 provides the spectator with one or more options for interacting with the gaming environment and receives a selection of the one or more options from the spectator. The implementation module 140 may then affect a change within the gaming environment based upon the selection received from the spectator.

With regard to the videogame program 125, the videogame program 125 may comprise any type of videogame application/program/set of executable instructions, including but not limited to, a multiplayer networked videogame such as a MMORPG (massively multiplayer online role-playing game), a first-person shooter, a strategy game, role playing games, action games, arcade games, simulation games, and so forth. Other suitable types of videogames that would be known to one of ordinary skill in the art are also likewise contemplated for use in accordance with the present technology. Active participants (e.g., game players) may interact with the gaming environment that is generated by the videogame program 125. With regard to conventional videogames, the gaming experience for active participants is largely, if not entirely, predetermined by game designers and encoded into the videogame. Therefore, other than actions performed within the gaming environment by other active participants, the gaming experience of an active participant is preconfigured into the executable instructions for the videogame.

Advantageously, the present technology allows for spectator interaction with the gaming environment. Spectator interaction may comprise positive and negative feedback of spectators such as applause, cheering, jeering, booing, or other audible feedback. In other instances, the feedback may be received from an end user computing system in the form of button click, mouse clicks, cursor movements, keystrokes, accelerometer sensed input, gesture-based input, motion sensing input, facial recognition, or any combinations thereof. Feedback may be received via a plurality of input devices associated with the end user computing system 115. The end user computing system 115 may provide the feedback to the networked gaming system 105.

According to some embodiments, the spectator module 130 may be executed to allow for spectator access to the gaming environment. This feature may be referred to as "spectator mode." Spectators may gain access to views of the gaming environment from a graphical user interface that is generated by the videogame program 125. The spectator environment may include a view of at least a portion of the gaming environment and/or a plurality of views of different portions of the gaming environment. In some instances, a spectator may be allowed to follow a selected or specified active participant. In other embodiments, the spectator may roam through the gaming environment in a free-form mode. Exemplary views of the gaming environment may comprise a first-person perspective view (relative to the spectator or an active participant, a top-down perspective view, and so forth. In other instances, the spectator module 130 may provide the spectator with a plurality of view features such as zoom, pan, replay, tilt, and so forth.

According to some embodiments, the spectator module 130 in combination with the implementation module 140 may add spectators to the gaming environment in an avatar form such that the spectators are visible to active participants and/or other spectators. The spectator module 130 may allow the spectator to specify the appearance attributes of their avatar such as height, weight, skin color, eye and hair color, clothing, and so forth. Alternatively, spectators may view the gaming environment transparently such that the spectators are unable to view the active participants and/or spectators.

In some embodiments, the videogame program 125 may track the position of one or more spectators within the gaming environment and determine active participants located proximate the spectators. Alternatively, if the spectator has chosen to follow a particular active participant, the videogame program 125 may track this information as well. Based upon the location information, the implementation module 140 may provide indication of feedback received from the spectator to one or more active participants. For example, if the spectator cheers for an active participant that the spectator is following, the cheers of the spectator may be played for the active participant such that the gaming experience of the active participant is enhanced.

In accordance with the present disclosure, the interactivity module 135 may be executed to facilitate spectator interaction with the gaming environment. Again, spectator interaction may include the receipt of feedback by the interactivity module 135. In other embodiments, spectator interaction may comprise an alteration/modification of the gaming environment. For example, spectators may be allowed to alter the appearance of the gaming environment, such as the time of day, the weather, a location or scene, a background, a landscape, and so forth.

In other embodiments, the spectator may be allowed to affect a change in the gaming environment that directly/indirectly affects the gaming experience of one or more active participants. For example, the spectator may be allowed to determine whether the active participant may be killed/saved, generate impediments (e.g., enemies, bosses, obstacles, etc.) for the active participant, present the active participant with a challenge, and so forth.

These types of alterations of the gaming environment may be caused by the interaction or input of a single spectator. In some embodiments, the actions, feedback, and/or input of a plurality of spectators may be utilized in the aggregate. For example, before feedback such as applause is played within the gaming environment, the interactivity module 135 may specify that applause related feedback should be received from a threshold number of spectators. In other instances, the interactivity module 135 may specify that the feedback reach a threshold decibel level before the feedback is provided within the gaming environment and/or to an active participant. For example, before feedback is provided to an active participant, the aggregate sound input provided by a plurality of spectators must meet or exceed a decibel level of 90. In other embodiments, before feedback is provided to an active participant, an aggregate number of button clicks received from a plurality of spectators must meet or exceed 1,000 actions within a period of 30 seconds. Thus, feedback requirements may both comprise quantity and/or time constraints, as well as other constraints that would be known to one of ordinary skill in the art.

According to some embodiments, the interactivity module 135 may provide the spectator with one or more options for interacting with the gaming environment. Again, these options may be tailored to the type of interactivity that is allowed for the spectator. For example, the interactivity module 135 may provide the spectator with a list of options such as: (1) introduce an enemy, (2) award gift, (3) send message, (4) select an adversary, and so forth. Once selected, the interactivity module 135 may provide the spectator with a plurality of additional selections that allow the spectator to further specify the details of the interaction. For example, if the spectator chooses option (1), the interactivity module 135 may provide the spectator with a list of selectable enemy types, quantities, and enemy attributes (e.g., strength, experience, inventory, etc.).

With regard to the awarding of a gift, spectators may be allowed to award a player with gift such as an award, a game achievement, such as the unlocking of a game feature (e.g., a level, a skill, a gaming experience, etc.). Gifts may also include objects such as weapons, inventory items (appropriate for the particular video game), a redeemable coupon, health, experience, and so forth. In some instances, a value of the gift may be commensurate with the amount of feedback received from one or more spectators. For example, if several spectators vote to award the player with a game achievement or other gift, the value of the reward may be greater than a reward provided to a player that received fewer amounts of votes. Again, the feedback may be measured in decibels, aggregate clicks of buttons, votes, and so forth.

In some instances, the ability for spectators to provide feedback may be utilized with a coliseum type gaming environment where combat between active participants may be arranged by certain groups of spectators. Moreover, enemies or other impediments may be introduced into the gaming environment. Additionally, other groups of spectators may be allowed to decide whether active participants that have lost in combat are killed/saved. Again, collaborative feedback may be utilized in these types of scenarios. In some embodiments, the gaming environment may include an arena/coliseum type location where spectators may be located within a viewing gallery and combat/activities between active participants may take place with a ring or other suitable location.

The implementation module 140 may be executed to implement the spectator feedback/interactions within the gaming environment. For example, if the spectator feedback includes applause or cheering, the implementation module 140 may play the applause or cheering within the gaming environment. Again, these types of audio feedback may be received from end user computing systems and transmitted to the networked gaming system 105. The playing of the applause or cheering may be directed to an active participant or may be played such that all active participants and other spectators may hear the applause/cheering. Similarly, boos or jeering may be played with the gaming environment. Therefore, both positive and negative feedback may be played within the gaming environment simultaneously to produce a realistic spectator environment (e.g., where some spectators boo and other cheer).

The implementation module 140 may generate and provide other indications of spectator feedback to complement the played feedback. These indications may comprise, but are not limited to, an icon, a sound effect, a visual effect, or any combinations thereof. More specifically, an icon may comprise an image of a "thumbs-up" or "thumbs-down." Likewise, a sound effect may comprise artificial/computer-generated applause, cheering, booing, stomping, and so forth. Exemplary visual effects may comprise fireworks, a video, a banner, and so forth. Again, each of these indications of feedback may be provided by the implementation module 140 upon the receipt of threshold levels of spectator feedback. Contrastingly, the implementation module 140 may provide indications of feedback as the feedback is received from spectators, without regard for threshold values for the feedback.

Similarly to spectator feedback, active participants may also provide feedback to spectators in response to a spectator affecting the gaming environment of the active participant. For example, the active participant may provide a "thank you" message for applause/cheers received from spectators. Likewise, active participants may incite, heckle, or otherwise taunt spectators that provide negative feedback. The feedback may be received from active participants by way of button clicks, mouse movements/clicks, motion-based input (e.g., received from accelerometer signals generated within a game controller), and other similar input mechanisms as those described with regard to spectators.

Figure 2:
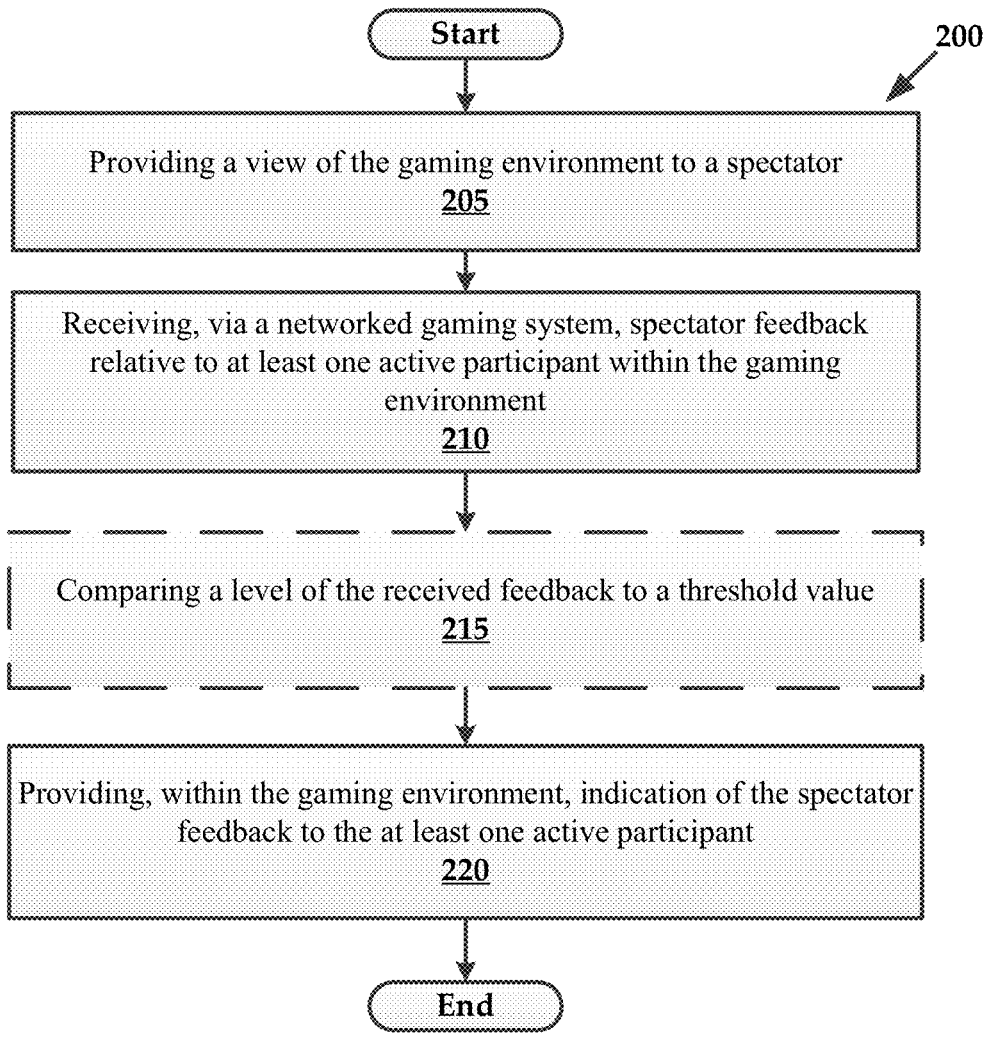
FIG. 2 is a flowchart of an exemplary method for providing spectator feedback within a gaming environment.

FIG. 2 is a flowchart of an exemplary method 200 for providing spectator feedback within a gaming environment. According to some embodiments, the method 200 may comprise a step 205 of providing a view of the gaming environment to a spectator. Next, the method 200 may comprise a step 210 of receiving, via a networked gaming system, spectator feedback relative to at least one active participant within the gaming environment. As described in greater detail above, the spectator feedback may comprise content that affects the gaming experience of an active participant. Feedback may comprise applause, cheering, booing, and so forth. Additionally, feedback may include modifications or alterations of the gaming environment that directly and/or indirectly affect the gaming experience of an active participant.

Advantageously, spectator feedback may comprise any of keystrokes, mouse movements, mouse clicks, audio input, accelerometer sensed input, gesture input, motion sensing input, facial recognition, or any combinations thereof.

In some instances the method 200 may comprise an optional step 215 of comparing a level of the received feedback to a threshold value. For example, a decibel level of audio feedback from a spectator may be compared to a decibel level threshold value, such as 90 decibels. Only audio feedback that has a decibel level of greater than 90 decibels may trigger further action by the system, such as providing indication of feedback. In other instances, the level of spectator feedback may comprise an aggregate number of spectators providing feedback.

Additionally, the method 200 may comprise a step 220 of providing, within the gaming environment, indication of the spectator feedback to the at least one active participant. Again, in some instances, indication of the spectator feedback to the at least one active participant occurs upon a level of spectator feedback exceeding a threshold amount. As described above, indication of spectator feedback may comprise any of an icon, a sound effect, a visual effect, or any combinations thereof.

Figure 3:
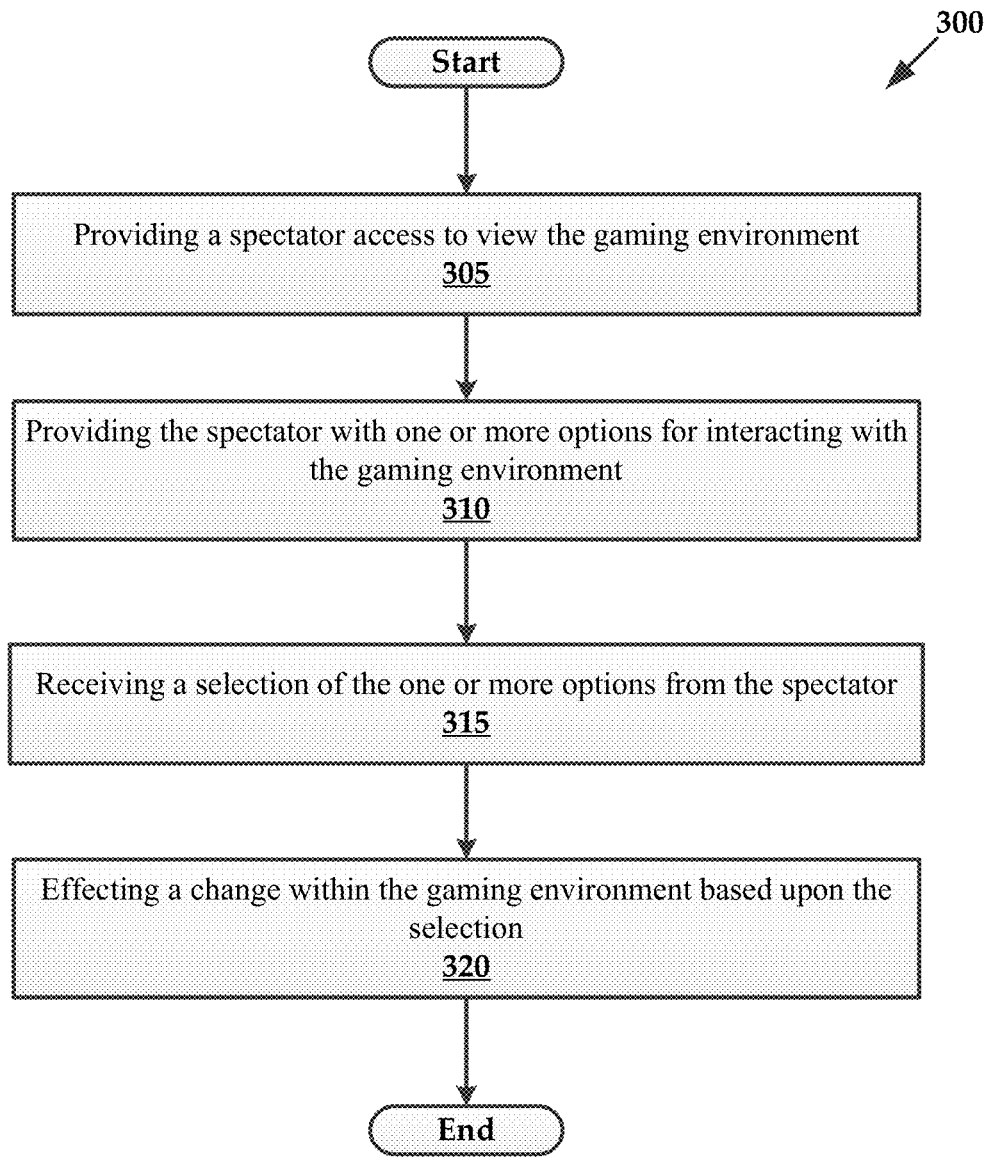
FIG. 3 is a flowchart of another exemplary method for facilitating spectator interaction with a gaming environment.

FIG. 3 is a flowchart of an exemplary method 300 for facilitating spectator interaction with a gaming environment. In accordance with the present disclosure, the method 300 may comprise a step 305 of providing a spectator access to view the gaming environment. It will be understood that the spectator may comprise an entity that is not actively engaged with game play within the gaming environment.

Next, the method 300 may comprise a step 310 of providing the spectator with one or more options for interacting with the gaming environment. By way of a few non-limiting examples, the options for spectator interaction may comprise allowing the active participant to be killed, arranging combat between two active participants, generating impediments for the active participant, presenting the active participant with a challenge, or any combinations thereof.

In some embodiments, the method 300 may comprise a step 315 of receiving a selection of the one or more options from the spectator, as well as a step 320 of effecting a change within the gaming environment based upon the selection.

Figure 4:
FIG. 4 is an exemplary view of a gaming environment.

FIG. 4 is an exemplary view 400 of a gaming environment 405. The gaming environment is shown as comprising an active participant 410 and 415 as well as a landscape 420. The gaming environment 405 is shown with enemies 425 and 430. It will be understood that this view of the gaming environment that is shown in FIG. 4 is an exemplary view that may be provided to a spectator. The view of FIG. 4 approximates the same view that the active participant views in a third-person view mode.

Figure 5:
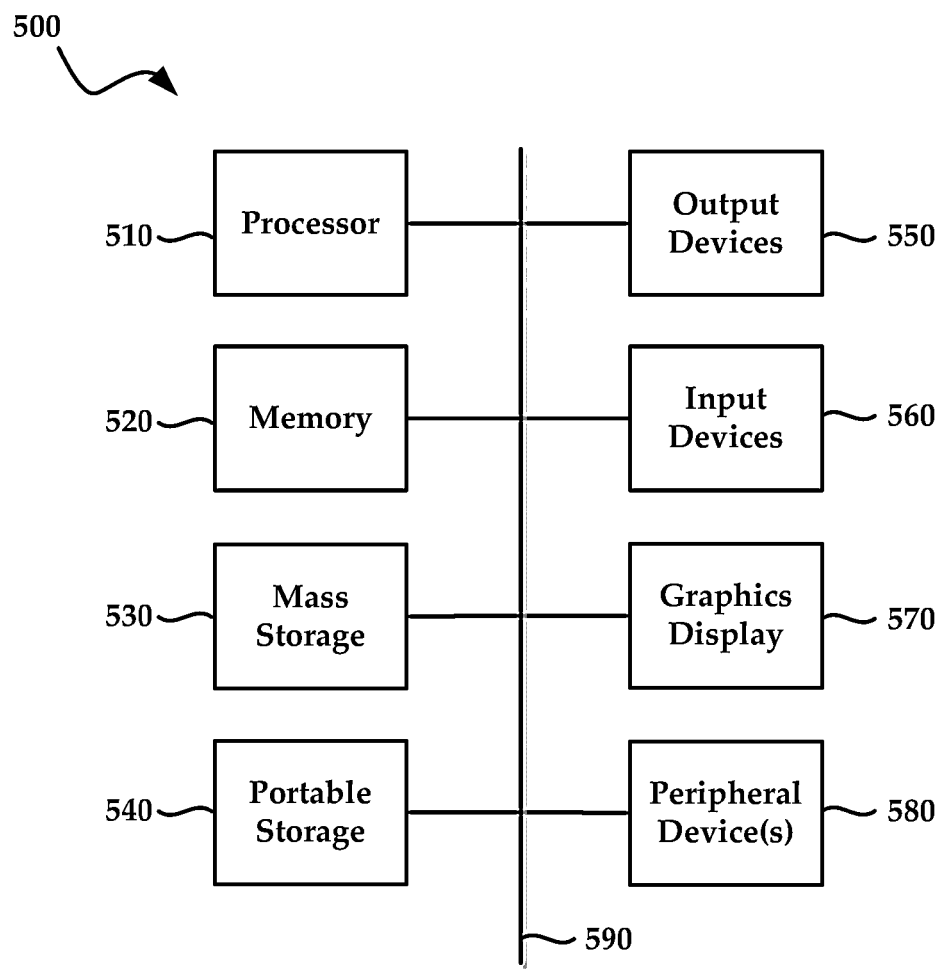
FIG. 5 is a block diagram of an exemplary computing system that may be utilized to practice aspects of the present disclosure.

FIG. 5 illustrates an exemplary computing system 500 that may be used to implement an embodiment of the present technology. Either of the end user computing system 115 and/or the server 110 may include one or more of the components of computing system 500. The computing system 500 of FIG. 5 includes one or more processors 510 and main a memory store 520. Main a memory store 520 stores, in part, instructions and data for execution by the one or more processors 510. Main a memory store 520 can store the executable code when the computing system 500 is in operation. The computing system 500 of FIG. 5 may further include a mass storage device 530, portable storage medium drive(s) 540, output devices 550, user input devices 560, a graphics display 570, and other peripheral device(s) 580.

The components shown in FIG. 5 are depicted as being connected via a single bus 590. The components may be connected through one or more data transport means. The one or more processors 510 and main a memory store 520 may be connected via a local microprocessor bus, and the mass storage device 530, peripheral device(s) 580, portable storage medium drive(s) 540, and graphics display 570 may be connected via one or more input/output (I/O) buses.

Mass storage device 530, which may be implemented with a magnetic disk drive or an optical disk drive, is a non-volatile storage device for storing data and instructions for use by one or more processors 510. Mass storage device 530 can store the system software for implementing embodiments of the present technology for purposes of loading that software into main a memory store 520.

Portable storage medium drive(s) 540 operate in conjunction with a portable non-volatile storage medium, such as a floppy disk, compact disk or digital video disc, to input and output data and code to and from the computing system 500 of FIG. 5. The system software for implementing embodiments of the present technology may be stored on such a portable medium and input to the computing system 500 via the portable storage medium drive(s) 540.

Input devices 560 provide a portion of a user interface. Input devices 560 may include an alphanumeric keypad, such as a keyboard, for inputting alphanumeric and other information, or a pointing device, such as a mouse, a trackball, stylus, or cursor direction keys. Additionally, the computing system 500 as shown in FIG. 5 includes output devices 550. Suitable output devices include speakers, printers, network interfaces, and monitors.

Graphics display 570 may include a liquid crystal display (LCD) or other suitable display device. Graphics display 570 receives textual and graphical information, and processes the information for output to the display device.

Peripheral device(s) 580 may include any type of computer support device to add additional functionality to the computing system. Peripheral device(s) 580 may include a modem or a router.

The components contained in the computing system 500 of FIG. 5 are those typically found in computing systems that may be suitable for use with embodiments of the present technology and are intended to represent a broad category of such computer components that are well known in the art. Thus, the computing system 500 of FIG. 5 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for providing spectator feedback within a gaming environment, the method comprising:
   adding one or more spectators to the gaming environment such that the one or more spectators are visible in the gaming environment to active participants and other spectators;
   receiving, via a networked gaming system, spectator feedback from the one or more added spectators relative to at least one active participant within the gaming environment; and
   providing, within the gaming environment, indication of the spectator feedback to the at least one active participant upon a level of spectator feedback exceeding a threshold amount.

2. The method according to claim 1, wherein the level of spectator feedback comprises a decibel level.

3. The method according to claim 1, wherein the level of spectator feedback comprises an aggregate number of spectators providing feedback.

4. The method according to claim 1, wherein the spectator feedback comprises any of keystrokes, mouse movements, mouse clicks, audio input, accelerometer sensed input, gesture input, motion sensing input, facial recognition, or any combinations thereof.

5. The method according to claim 1, wherein indication of the spectator feedback comprises any of an icon, a sound effect, a visual effect, or any combinations thereof.

6. The method according to claim 1, wherein when the spectator feedback comprises audio input, the indication of the spectator feedback comprises the audio input, which is played within the gaming environment.

7. A method for facilitating spectator interaction within a gaming environment, the method comprising:
   placing an active participant into a spectator mode when the activate participant is killed in the gaming environment;
   providing the placed spectator access to view the gaming environment using a spectator module, the spectator comprising an entity that is not actively engaged with game play while roaming within the gaming environment;
   receiving, via the gaming environment, spectator feedback from the one or more placed spectators relative to at least one active participant within the gaming environment; and
   providing, within the gaming environment, indication of the spectator feedback to the at least one active participant upon a level of spectator feedback exceeding a threshold amount.

8. The method according to claim 7, wherein the spectator affects a gaming experience of an active participant by any of: allowing the active participant to be killed, arranging combat between two active participants, generating impediments for the active participant, presenting the active participant with a challenge, or any combinations thereof.

9. A system that facilitates a gaming environment, the system comprising:

at least one server that is selectively coupleable to an end user computing system, the at least one server comprising a processor configured to execute instructions that comprise:

a videogame program that provides the gaming environment and tracks a position of one or more spectators within the gaming environment, the videogame program comprising:

a spectator module that provides a spectator access to a first-person perspective view of the gaming environment while roaming through the gaming environment;

an interactivity module that provides the spectator with one or more options for interacting with the gaming environment and receives a selection of the one or more options from the spectator;

an implementation module that effects a change within the gaming environment based upon the selection; and a feedback module that:

receives spectator feedback from the spectator relative to at least one active participant within the gaming environment; and provides an indication of the spectator feedback to the at least one active participant within the gaming environment upon a level of the spectator feedback exceeding a threshold amount.

10. The system according to claim 9, wherein the implementation module effects a change within the gaming environment by altering a gaming experience of an active participant.

11. The system according to claim 9, wherein the videogame program tracks a location of a spectator while the spectator follows an active participant through the gaming environment, and the implementation module effects a change within the gaming environment by providing spectator feedback to the followed active participant.

12. The system according to claim 9, wherein the implementation module effects a change within the gaming environment by provision of a virtual gift from a spectator to an active participant, the virtual gift being presented to the active participant within the gaming environment.

13. The system according to claim 9, wherein the spectator feedback is received from the spectator using an audio input device and comprises an audio feedback relative to the at least one active participant within the gaming environment.

14. The system according to claim 9, wherein the feedback module further receives a response from the at least one active participant and provides indication of the response to the spectator.

* * * * *